(12) United States Patent
Craig

(10) Patent No.: US 6,606,634 B2
(45) Date of Patent: Aug. 12, 2003

(54) OBTAINING TABLE OBJECTS USING TABLE DISPENSERS

(75) Inventor: Robert M. Craig, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/263,323

(22) Filed: Oct. 1, 2002

(65) Prior Publication Data

US 2003/0037047 A1 Feb. 20, 2003

Related U.S. Application Data

(63) Continuation of application No. 09/360,445, filed on Jul. 26, 1999, now Pat. No. 6,466,943.

(51) Int. Cl.[7] .............................................. G06F 17/30
(52) U.S. Cl. ............................. 707/102; 707/2; 707/3; 707/103; 717/5; 711/203
(58) Field of Search ................................. 707/102, 103, 707/2, 3; 717/5, 167, 178, 173; 711/203; 709/315, 329

(56) References Cited

U.S. PATENT DOCUMENTS

| | | | | |
|---|---|---|---|---|
| 5,485,617 A | * | 1/1996 | Stutz et al. | 709/315 |
| 5,517,645 A | * | 5/1996 | Stutz et al. | 709/316 |
| 5,689,703 A | * | 11/1997 | Atkinson et al. | 707/103 R |
| 5,706,505 A | * | 1/1998 | Fraley et al. | 707/103 R |
| 5,794,038 A | * | 8/1998 | Stutz et al. | 709/315 |
| 5,822,580 A | * | 10/1998 | Leung | 707/103 R |
| 5,842,018 A | * | 11/1998 | Atkinson et al. | 715/501.1 |
| 5,890,014 A | * | 3/1999 | Long | 710/8 |
| 5,911,068 A | * | 6/1999 | Zimmerman et al. | 709/328 |
| 5,950,011 A | * | 9/1999 | Albrecht et al. | 717/167 |
| 6,038,399 A | * | 3/2000 | Fisher et al. | 717/178 |
| 6,092,189 A | * | 7/2000 | Fisher et al. | 713/1 |
| 6,154,878 A | * | 11/2000 | Saboff | 717/173 |

OTHER PUBLICATIONS

Dale Rogerson, Inside COM, 1997; Chater 1, pp. 116–126.*
Distributed Computing Monitor vol. 13, COM+ The future of Microsoft's component object model, featured report by david chappell, pp. 3–11.*

* cited by examiner

Primary Examiner—Jean M. Corrielus
(74) Attorney, Agent, or Firm—Lee & Hayes, PLLC

(57) ABSTRACT

A table dispenser provides one or more table objects for accessing one or more datastores containing configuration information in a computer system, responsive to a request for a table from a caller. The table objects combine to present a location-independent and format-independent table of configuration information to the caller. To access one or more datastores, a caller creates a table system by passing input parameters to a table dispenser. The table dispenser references a wiring database to determine an appropriate combination of table object dispensers needed to create necessary table objects and return the desired table to the caller. The table dispenser and table object dispensers may operate recursively to provide multiple configurations of table systems. The wiring database supports database-wide and file-wide wiring relationships to provide general wiring instructions to the table dispenser.

12 Claims, 8 Drawing Sheets

OBTAINING TABLE OBJECTS USING TABLE DISPENSERS

This application is a continuation of application Ser. No. 09/360,445,filed Jul. 26, 1999, now issued as U.S. Pat. No. 6,466,943, which application(s) are incorporated herein by reference.

TECHNICAL FIELD

The invention relates generally to object-oriented data processing and system management, and more particularly to obtaining abstraction layers to access one or more datastores.

BACKGROUND OF THE INVENTION

In a distributed computer environment, client computer systems and server computer systems can share data and executable program code, including applications, services, and resources. In order to facilitate the sharing of these various elements, attribute-based programming allows a developer to specify the services and resources required by an application by setting properties (or "attributes") of each application or component rather than implementing or calling those services directly from the implementation code. Attributes include a particular set of configuration information that is made available to various callers in an attribute-based environment.

Configuration information may be stored on the various machines in the distributed network and relates to specific properties of applications, components, services, and other resources available to that machine. In existing approaches, a system "registry" has been used to store configuration data for a particular machine. However, in existing approaches, a programmer was required to access and manipulate registry information directly, introducing undesirable program complexity and exposing the registry to corruption by improper programming. Moreover, the distribution of configuration information among multiple datastores (i.e., in addition to the registry) and data formats is not accommodated by existing approaches, particularly if the location and format of data are expected to evolve over time. In current approaches, the implementation code itself must be altered in order to handle location and format changes to configuration information. Accordingly, existing approaches lack location and format independence that can provide desired flexibility for storage and access to configuration information in a computer system.

SUMMARY OF THE INVENTION

In accordance with the present invention, the above and other problems are solved by dispensing a table system based on provided input parameters, such as a database ID, a table ID, and other parameters. The table system presents a location-independent and format-independent table to the caller. The underlying implementation of the table system may consist of combinations of multiple table objects and datastores containing configuration information. A wiring table provides initial instructions about dispensing the table objects in accordance with the input parameters.

A computer program product providing a caller with access to a requested table of configuration information stored in one or more datastores is provided. A first identity parameter specifying the requested table is received from the caller. A first wiring relationship is read from a wiring database based on the first identity parameter, wherein the first wiring relationship relates the first identity parameter to a first table object dispenser. The first table object dispenser is executed to create a first table object. The requested table is presented to the caller via a table interface in the first table object.

A system for providing a caller with access to a requested table of configuration information stored in one or more datastores is provided. A first identity parameter is passed by the caller identifying the requested table. A first table object provides a table interface to the requested table. A first table object dispenser creates the first table object corresponding to the first identity parameter. A wiring database defines a first wiring relationship between the first identity parameter and the first table object dispenser. A table dispenser reads the first wiring relationship from the wiring database and executes the first table object dispenser, responsive to the first wiring relationship, to present the requested table to the caller via the table interface.

DETAILED DESCRIPTION OF THE INVENTION

An embodiment of the present invention dispenses table objects for accessing one or more datastores in a computer system. To access one or more datastores, a caller obtains a table object by passing input parameters to a table dispenser. The table dispenser references a wiring database to determine an appropriate configuration of table objects needed to return the desired table object to the caller. In the preferred embodiment, the table dispenser and table objects are employed in a catalog environment for an attribute-based programming model; however, the present invention can be broadly applied to access any type of datastore.

Figure 1:
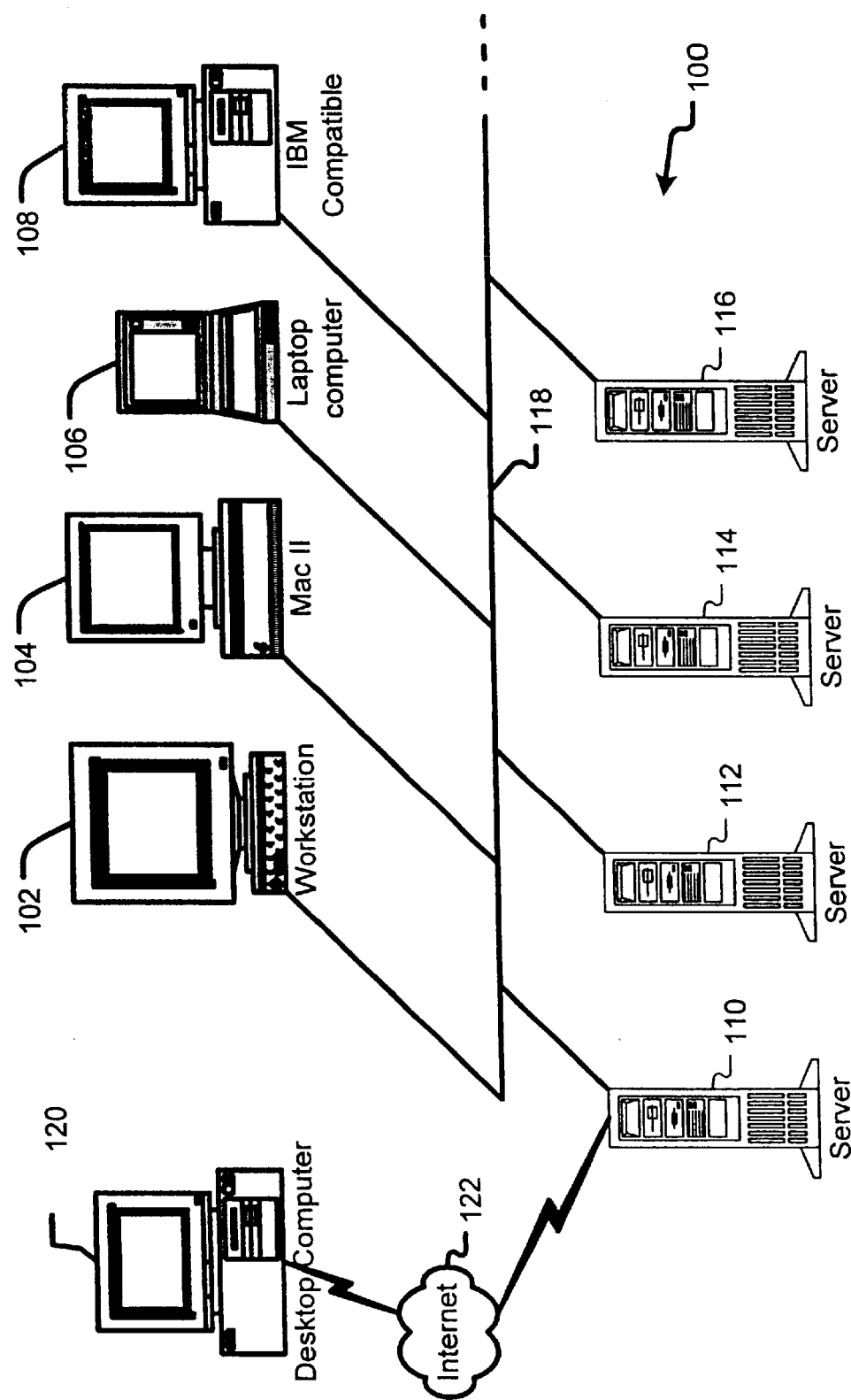
FIG. 1 illustrates a pictorial representation of a suitable client-server computing environment in which an embodiment of the present invention may be implemented in both clients and servers.

FIG. 1 is a pictorial representation of a suitable client-server computing environment in which an embodiment of the present invention may be implemented in both clients and servers. In a computing network 100, client computer systems 102, 104, 106 and 108 are connected to server computer systems 110, 112, 114 and 116 by a network connection 118. Additionally, client computer 120 is connected to server computer 110 via a communication link, such as the Internet 122 or a local area network. Since the server 110 is connected via the network connection 118 to the other servers 112, 114 and 116, the client computer 120 is also connected and may access information on the other servers 112, 114 and 116, and clients 102, 104, 106, and 108, as well as other computer systems coupled to the network 100.

The client computer systems 102, 104, 106, 108 and 120 operate using at least some of the information and processes available on at least one of the servers 110, 112, 114 and 116 as well as other computer systems coupled to the network 100. Each client is preferably a complete, stand-alone computer and offers the user a full range of power and features for running applications. The clients 102, 104, 106 and 108, however, may be quite different from the other clients as long as they can communicate via the common interface 118.

The servers 110, 112, 114 and 116 are preferably computers, minicomputers, or mainframes that provide traditional strengths offered by minicomputers and mainframes in a time-sharing environment (e.g., data management, information sharing between clients, and sophisticated network administration and security features). The client and server machines work together to accomplish the processing of the executed application. Working together in this manner increases the processing power and efficiency relating to each independent computer system shown in FIG. 1.

Typically, a client portion or process of an application executed in the distributed network 100 is optimized for user interaction whereas a server portion or process provides the centralized, multi-user functionality. However, each client computer 102, 104, 106, 108 and 120 can perform functions for other computers, including the clients and servers, thus acting as a "server" for those other computer systems. Similarly, each of the servers 110, 112, 114 and 116 can perform functions and relay information to the other servers, such that each server may act as a "client" requesting information or services from another computer in particular circumstances. Therefore, the term "client, " as used hereinafter refers to any computer system making a call or request of another computer system and the term "server" is the computer system servicing the request.

As part of the sophisticated network administration, each computer is able to access configuration information related to applications and resources available on the other computers in the network 100. The configuration information is located within memory or persistent storage on each computer system, i.e., in a datastore. Additionally, each computer system may have more than one datastore of configuration information that must be accessed by the other computer systems. Moreover, the different datastores may each have different data types or formats. In order to access configuration information from these many and various computer datastores, a client, i.e., the system or process making the request for information, communicates with a "catalog" interface on the computer system.

Figure 2:
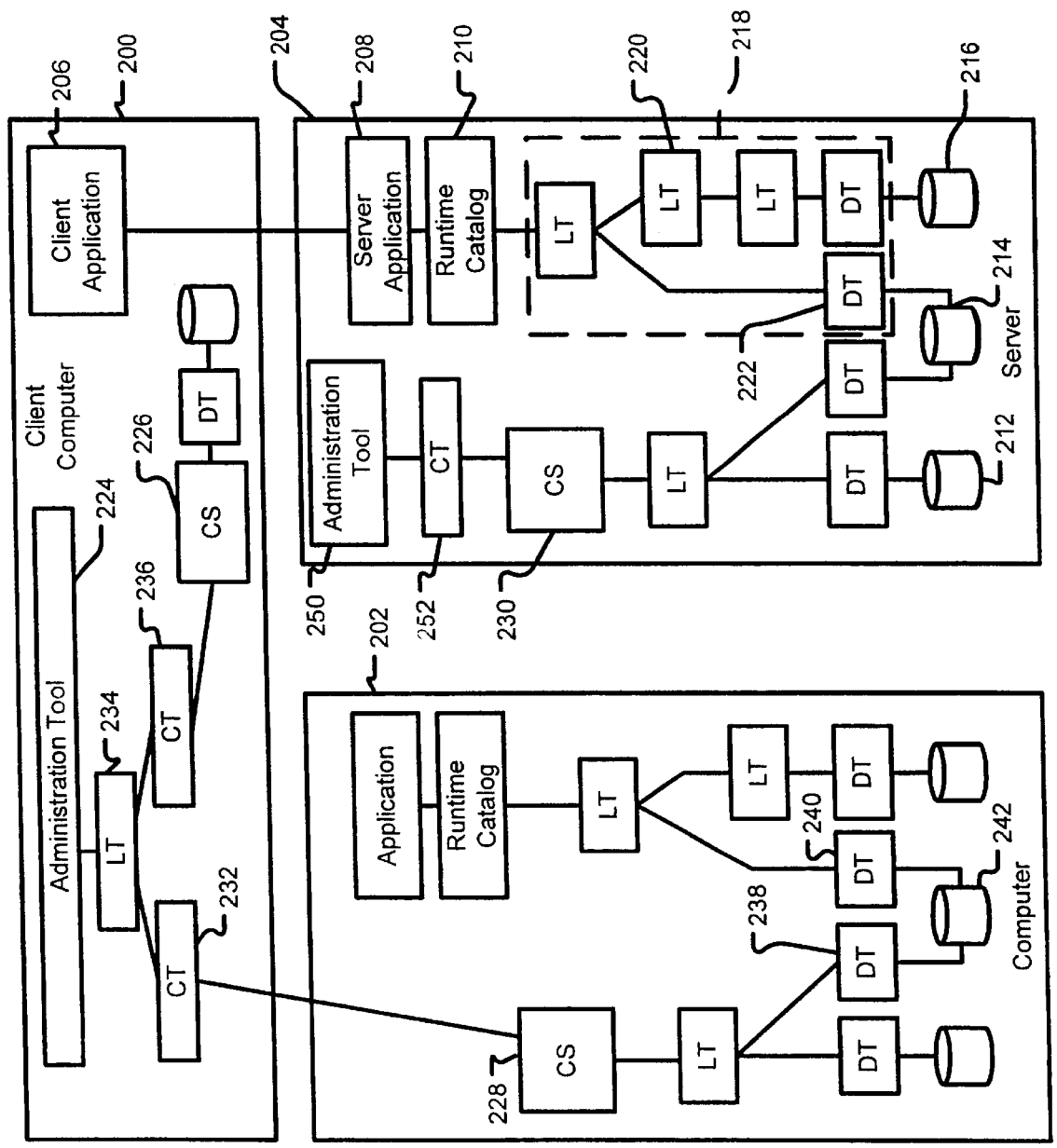
FIG. 2 shows an exemplary client/server architecture employing COM+ catalogs (Component Object Model) in accordance with the present invention.

FIG. 2 depicts an exemplary client/server architecture employing COM+ catalogs in accordance with the present invention (COM is an acronym for Component Object Model). A COM+ Catalog is a virtualized database of COM+ applications and their services, with runtime and configuration-time abstraction layers for using and manipulating configuration information. An embodiment of the present invention, for example, may be employed in a component-based programming model of a transaction processing runtime environment for developing, deploying, and managing high-performance, scaleable, and robust enterprise Internet and intranet server applications.

A "component" is software containing classes that may be created and exposed as "objects" (i.e., self-contained programmed entities that consist of both data and functions to manipulate the data) for use by another application. A component can also use objects exposed by another application. For example, a developer can create an application using ActiveX components that can be updated and managed easily as in-process DLLs (Dynamic Link Libraries). The DLLs are then installed into the COM environment for execution within the application. Components can be developed specifically for a developer's single application, developed for use with multiple applications, or purchased from a third party.

COM technology allows a piece of software to offer services to another piece of software by making those services available as "COM objects". COM is a foundation for an object-based system that focuses on reuse of interfaces. It is also an interface specification from which any number of interfaces can be built. Each COM object is an instance of a particular class and supports a number of interfaces, generally two or more. Each interface includes one or more methods, which are functions that can be called by the objects's clients.

COM+ technology is an extension of COM technology that includes a new runtime library that provides a wide range of new services, such as dynamic load balancing, queued components, an in-memory database, and events. COM+ technology maintains the basics of COM technology, and existing COM-based applications can continue to work unchanged in a COM+ environment.

An object implemented to comply with COM+ is referred to as a "COM+ object". A component that includes one or more classes that may be instantiated as a COM+ object is referred to as a "COM+ component". Each COM+ component has attributes, which can be set in a component (or type) library. Attributes are a form of configuration data required by many software components to execute correctly and completely. An application that includes COM+ components is referred to as a "COM+ application". When a component is made part of a COM+ application, its component (or type) library is written into a COM+ catalog. When an object is instantiated from that component, the attributes in the COM+ catalog are examined to determine the object context that contains properties for the object. Based on the object context, other services required by the object are provided. In this manner, a developer can merely identify in the attributes the additional functionality required by the object, and based on the object's attributes, the appropriate other services that are available within the system, or the accessible network, are executed to provide that functionality.

In FIG. 2, a client computer 200 is coupled via a network to one or more remote computers (e.g., a computer 202 and a server 204). Although the embodiments of the present invention are illustrated and described herein relative to multiple computer systems coupled by a computer network or other communications connection, it is to be understood that an embodiment of the present invention may be employed in a stand-alone computer system to provide access to configuration information in the system.

A client application 206 executes on the client computer 200 to access a server application 208 executing on the server 204. For example, the server application 208 may include a database application that receives a query from the client application 206 and accesses a customer database (not shown) for all customer data satisfying the query. During operation, the server application 208 may require configuration data recorded in a datastore (such as datastores 214 or 216). For example, a transaction server application can determine the security level of a user according to a "role" assigned to the user by an administrator or other means. Accordingly, the transaction server application might query a role definitions database to validate the user's access to a transaction database (not shown). In another example, the server application 208 accesses configuration information to verify that required services are available for its execution.

To obtain configuration information in the illustrated embodiment, the server application 208 accesses a runtime catalog 210 running on the server 204. The runtime catalog 210 causes one or more table object dispensers to create catalog table objects (shown generally as table system 218) providing the required configuration data in a table to the server application 208. A "table object" includes an object that provides a caller with access to underlying data, presenting that data in virtual "table" format through a defined table interface. A table object may also provide its own functionality, read and write caching and the triggering of external events, in addition to other features. The table data is accessed by a caller (e.g., a catalog server, a runtime catalog, or an overlaying logic table object) by way of a table-oriented interface, preferably including table cursor methods. In the exemplary embodiment, the runtime catalog 210 accesses configuration data in the datastores 214 and 216 through layers of abstraction provided by the table system 218 (i.e., including logic table objects (LT), such as logic table object 220, and data table objects (DTs), such as data table object 222).

A globally unique database ID (identifier) called a "DID" identifies each catalog database. A given DID guarantees a minimum well-defined set of catalog tables, each table being identified by and complying to the rules of a table ID (TID). A DID is a datastore-independent identity, meaning that the tables of that database can be distributed among multiple datastores. Examples of datastores include the registry, type libraries, SQL (structured query language) Servers, and the NT Directory Service (NT DS), whereas examples of databases include: server group databases, download databases, and deployment databases.

A data table object, such as data table object 222, is a datastore-dependent table object that exposes a table cursor into a particular datastore. The table cursor provides a well-defined table-oriented interface into the datastore while hiding the location and format of the underlying datastore itself. For example, a caller can use a table cursor to navigate through the rows of a column in a table presented to the caller by a table object.

Each data table object is bound to a particular datastore accessible within the computer. For example, a data table object may be bound to the registry to provide the registry data in table form to a higher level (e.g., an overlaid logic table object, catalog server object, or runtime catalog). Another data table object may be bound to the NT Directory Services to provide directory configuration data to a higher level. As shown by data table objects 238 and 240, multiple data table objects may be created for a single datastore (e.g., data table objects 238 and 240 are created by different logic tables objects to provide access to the same datastore 242).

The data table object 222 populates one or more internal caches with read or write data associated with the datastore 214. Queries to the datastore 214 are serviced by the cache or caches through the data table object's table interface. Using at least one "update" method, data in the read cache of data table object 222 may be refreshed from the datastore 214 and data in a write cache may be flushed to the datastore 214. Data table objects are described in more detail in U.S. patent application Ser. No. 09/360,442, entitled "DATA TABLE OBJECT INTERFACE FOR DATASTORE," assigned to the assignee of the present application, and incorporated herein by reference for all that it discloses and teaches.

A logic table object, such as logic table object 220, presents domain-specific table data by logically merging or consolidating table data from multiple data table and/or logic table objects, supplementing table functionality, and/or synthesizing data into the table. Logic table objects in a COM+ Catalog environment are type-independent abstraction layers between a caller (such as the runtime catalog 210) and one or more datastores (such as datastores 214 and 216) containing configuration information. A logic table object typically sits atop one or more data table objects and introduces domain-specific rules and processes to the underlying data table objects, although other configurations of table systems are possible (see FIG. 4).

More specifically, a logic table object can logically merge or consolidate configuration data from multiple data table and/or logic table objects into a single table based on predetermined logic (e.g., according to type). Furthermore, a logic table object can supplement data table object functionality by intercepting interface calls from a client and adding to or overriding the underlying table object functionality (e.g., adding validation or security). Additionally, a logic table object can synthesize data that is not available from the underlying datastores or tables and present the synthesized data as part of the table. Logic table objects are described in more detail in U.S. patent application Ser. No. 09/360,440, entitled "A LOGIC TABLE ABSTRACTION LAYER FOR ACCESSING CONFIGURATION INFORMATION," assigned to the assignee of the present application, and incorporated herein by reference for all that it discloses and teaches.

The foregoing discussion has described the COM+ Catalog environment as used at runtime by an application. An alternate use of a COM+ Catalog occurs at configuration-time and may employ one or more catalog server objects (CS) and one or more client tables. During configuration, an administration tool, such as Microsoft's Component Services administration tool or COMAdmin Library, is used to create and configure COM+ applications, install and export existing COM+ applications, manage installed COM+ applications, and manage and configure services locally or remotely. Accordingly, in addition to the illustrated embodiments, an embodiment of the present invention may be employed by a local administration tool managing an application running on a remote computer system.

The exemplary administration tool 224 executes on the client computer 200 in FIG. 2. An alternative administration tool (such as administration tool 250) can execute on another computer (such as server 204) to configure applications and services executing in the computer. A catalog server object, such as catalog server objects 226, 228, and 230, manages configuration information on its computer. All administration requests to a computer, whether local or from another computer, go to a catalog server object on that computer, preferably through one or more abstraction layers, including client table objects and logic table objects.

A client table object (CT) is analogous to a data table object that binds to a particular local or remote catalog server object instead of a datastore, presenting the configuration information marshaled by a catalog server object in table form to the caller, such as the administration tool 224. The local catalog server object 226 manages configuration data locally on the client computer 200, while the remote catalog server object 228 service catalog requests from the client table object 232 for configuration information on its remote computer. "Remote" does not necessarily imply that a remote computer geographically distant from a local computer. Instead, remote merely indicates a cross-computer boundary, which may be bridged by a data bus, a network connection, or other connection means.

To access available catalog data in the illustrated exemplary embodiment, the administration tool 224 optionally causes a logic table object 234 to be created, which in turn causes client table objects 232 and 236 to be created for accessing available catalog server objects 226, and 228. The local catalog server object 226 and the remote catalog server object 228 marshal the configuration information stored within their corresponding computers by causing creation of underlying table systems and transferring the data back to the client table objects 232 and 236 for presentation as table data to the logic table object 234, which logically merges the configuration information and presents the configuration information to the administration tool 224 in table format. In the illustrated embodiment, multiple domain-specific logic table objects (such as logic table object 234) can reside between the client table objects 232 and 236, and the administration tool 224. Alternatively, the administration tool 224 may cause only a single client table object (with or without overlaying logic table objects) to be created to access a single catalog server object on a local or remote computer.

Figure 3:
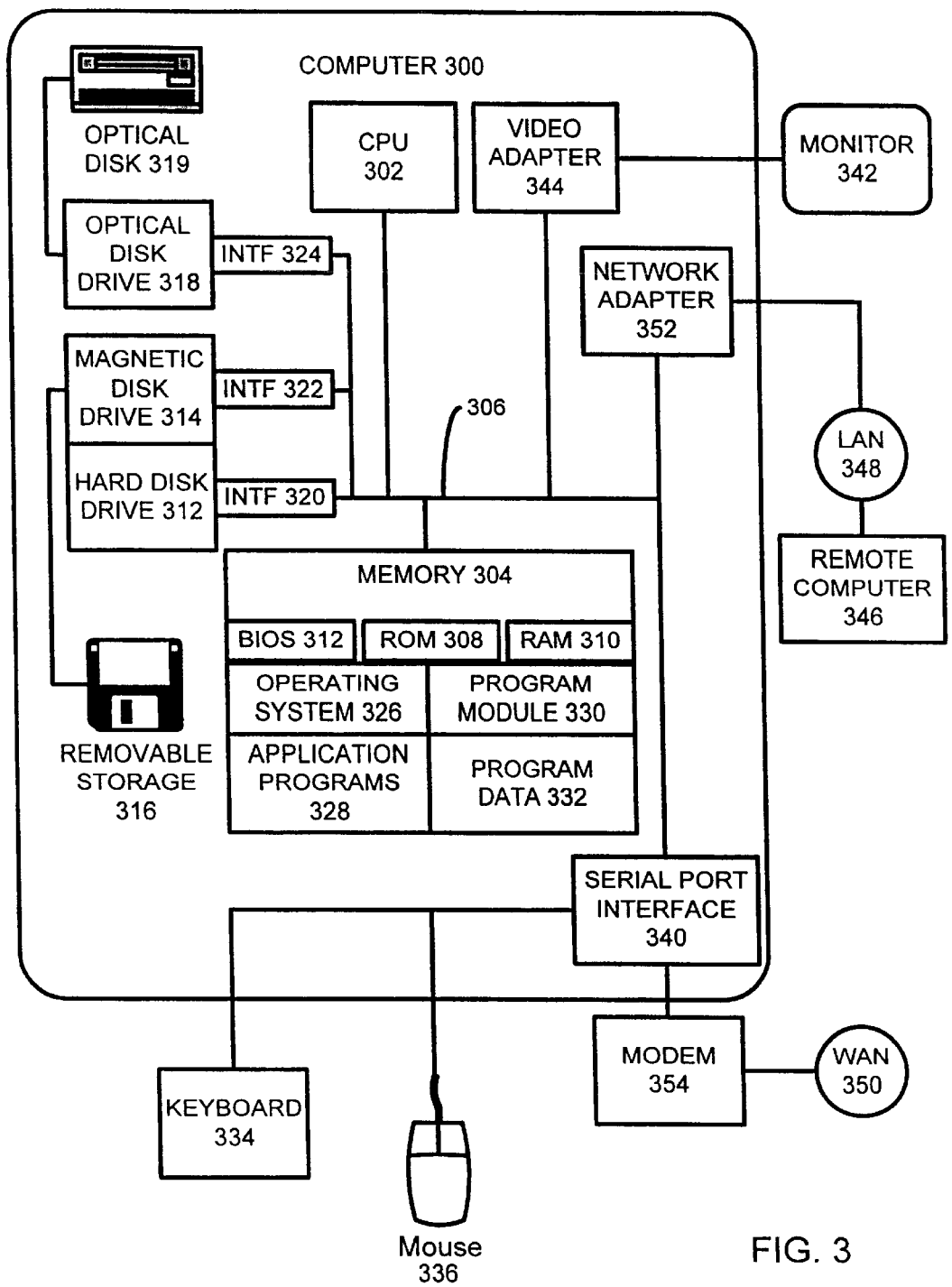
FIG. 3 illustrates an exemplary system for implementing the computing system in an embodiment of the present invention.

With reference to FIG. 3, an exemplary computing system for embodiments of the invention includes a general purpose computing device in the form of a conventional computer system 300, including a processor unit 302, a system memory 304, and a system bus 306 that couples various system components including the system memory 304 to the processor unit 300. The system bus 306 may be any of several types of bus structures including a memory bus or memory controller, a peripheral bus and a local bus using any of a variety of bus architectures. The system memory includes read only memory (ROM) 308 and random access memory (RAM) 310. A basic input/output system 312 (BIOS), which contains basic routines that help transfer information between elements within the computer system 300, is stored in ROM 308.

The computer system 300 further includes a hard disk drive 312 for reading from and writing to a hard disk, a magnetic disk drive 314 for reading from or writing to a removable magnetic disk 316, and an optical disk drive 318 for reading from or writing to a removable optical disk 319 such as a CD ROM, DVD, or other optical media. The hard disk drive 312, magnetic disk drive 314, and optical disk drive 318 are connected to the system bus 306 by a hard disk drive interface 320, a magnetic disk drive interface 322, and an optical drive interface 324, respectively. The drives and their associated computer-readable media provide nonvolatile storage of computer readable instructions, data structures, programs, and other data for the computer system 300.

Although the exemplary environment described herein employs a hard disk, a removable magnetic disk 316, and a removable optical disk 319, other types of computer-readable media capable of storing data can be used in the exemplary system. Examples of these other types of computer-readable mediums that can be used in the exemplary operating environment include magnetic cassettes, flash memory cards, digital video disks, Bernoulli cartridges, random access memories (RAMs), and read only memories (ROMs).

A number of program modules may be stored on the hard disk, magnetic disk 316, optical disk 319, ROM 308 or RAM 310, including an operating system 326, one or more application programs 328, other program modules 330, and program data 332. A user may enter commands and information into the computer system 300 through input devices such as a keyboard 334 and mouse 336 or other pointing device. Examples of other input devices may include a microphone, joystick, game pad, satellite dish, and scanner. These and other input devices are often connected to the processing unit 302 through a serial port interface 340 that is coupled to the system bus 306. Nevertheless, these input devices also may be connected by other interfaces, such as a parallel port, game port, or a universal serial bus (USB). A monitor 342 or other type of display device is also connected to the system bus 306 via an interface, such as a video adapter 344. In addition to the monitor 342, computer systems typically include other peripheral output devices (not shown), such as speakers and printers.

The computer system 300 may operate in a networked environment using logical connections to one or more remote computers, such as a remote computer 346. The remote computer 346 may be a computer system, a server, a router, a network PC, a peer device or other common network node, and typically includes many or all of the elements described above relative to the computer system 300. The network connections include a local area network (LAN) 348 and a wide area network (WAN) 350. Such networking environments are commonplace in offices, enterprise-wide computer networks, intranets, and the Internet.

When used in a LAN networking environment, the computer system 300 is connected to the local network 348 through a network interface or adapter 352. When used in a WAN networking environment, the computer system 300 typically includes a modem 354 or other means for establishing communications over the wide area network 350, such as the Internet. The modem 354, which may be internal or external, is connected to the system bus 306 via the serial port interface 340. In a networked environment, program modules depicted relative to the computer system 300, or portions thereof, may be stored in the remote memory storage device. It will be appreciated that the network connections shown are exemplary, and other means of establishing a communication link between the computers may be used.

In an embodiment of the present invention, the computer system 300 stores the configuration data and implementation code providing the catalog infrastructure and disclosed and claimed herein in accordance with the present invention. The catalog infrastructure has without limitation one or more datastores, catalog servers, runtime catalogs, server applications, administration tools, dispensers, and wiring databases. Specifically, one or more dispensers, preferably including a table dispenser and a table object dispenser, provide a table object to a caller providing location and type independent access to configuration information stored in one or more datastores.

Figure 4:
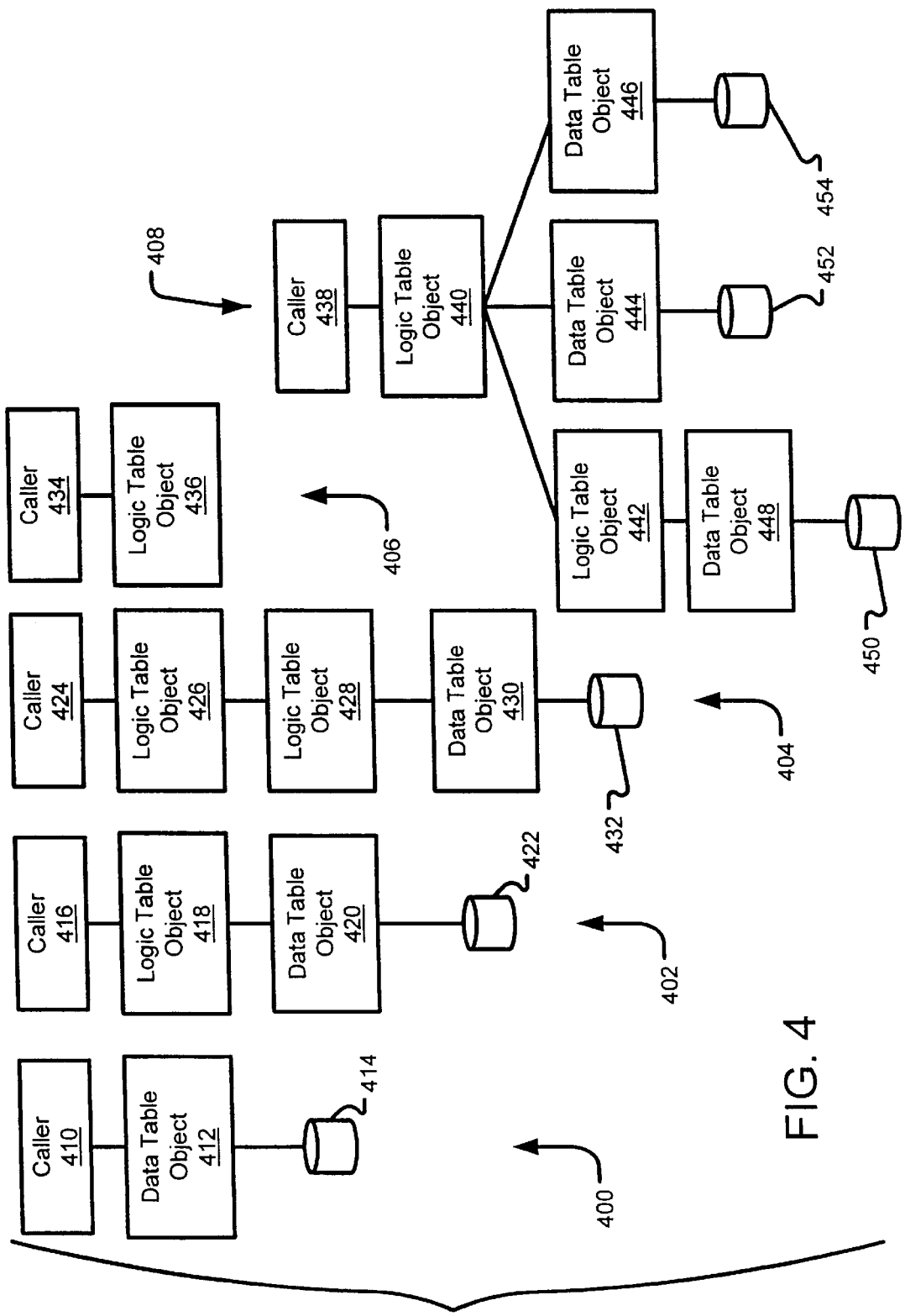
FIG. 4 depicts various examples of table systems in embodiments of the present invention.

FIG. 4 depicts various examples of table systems in embodiments of the present invention. Logic table and data table objects are described in the description of FIG. 2 and the incorporated references. With regard to a table system 400, a caller 410 (as well as other callers in FIG. 4) may be a catalog server, a runtime catalog, or another object requiring abstracted access to a datastore. To initiate access to requested information, the caller 410 provides input parameters, such as a database ID, a table ID, query parameters, and a level of service parameter, relating to the configuration information it is requesting. A table dispenser (see the table dispenser 502, for example, in FIG. 5A) returns to the caller 410 a pointer to a table object, in this case a single data table object 412 bound to a datastore 414. Through a table interface accessible via the pointer to the data table object 412, the caller 410 can access tabularized configuration data (i.e., a data level table) originating from the datastore 414.

With regard to a table system 402, the table dispenser provides a caller 416 with an interface of a logic table object 418, which overlays a data table object 420. The data table object 420 is bound to a datastore 422 and provides access to a data level table of configuration data originating from the datastore 422 to the logic table object 418. Through a table interface provided to caller 416, the logic table object 418 can present to the caller a logic level table of configuration information, including without limitation (1) a remapping (i.e., an alternate table configuration) of the data provided by data table object 420; (2) supplemental functionality (e.g., validation of data); and (3) synthesized data (e.g., data not resident in datastore 422, but instead, data derived or calculated from data in datastore 422 or another source). The logic table object 418 can also trigger external operations. These features of a logic table object are described in greater detail in the previously incorporated U.S. patent application Ser. No. 09/360,440, entitled "A LOGIC TABLE ABSTRACTION LAYER FOR ACCESSING CONFIGURATION INFORMATION".

With regard to a table system 404, two levels of logic table objects (i.e., logic table objects 426 and 428) are positioned between a caller 424 and a data table object 430, which is bound to a datastore 432. Preferably, functionality is modularized using multiple logic table objects. For example, the logic table object 426 may be responsible for enforcing security constraints on accesses to configuration data, whereas the logic table object 428 may validate data before writing configuration data to the datastore 432. Other functional combinations are possible at the discretion of the developer. In an embodiment of the present invention, the combinations of logic table and data table objects required to satisfy a requested database ID and table ID are specified in a wiring database accessed by the table dispenser.

With regard to a table system 406, a caller 434 has access to configuration data through a logic table object 436 without an underlying data table object or datastore. The logic table object 436 may provide table-based synthesized data to the caller or otherwise provide or trigger functionality outside the scope of the catalog's tables. For example, the logic table object 436 may intercept calls to an unsupported datastore and return errors to the caller 434. Alternatively, the logic table object 436 may translate or remap table data originally provided by the caller 434 or an external source, rather than by a datastore.

With regard to a table system combination 408, a caller 438 gains access to configuration data originally stored in or derived from datastores 450, 452, or 454. A logic table object 440 logically merges or consolidates data from a logic table object 442, data table object 444, which is bound to datastore 452, and data table object 446, which is bound to datastore 454. The logic table object 442 overlays a data table object 448, which is bound to datastore 450. In this configuration, the logic table object 440 logically merges data from the underlying catalog tables and presents the configuration data as a logic level table to the caller 438.

Figure 5A:
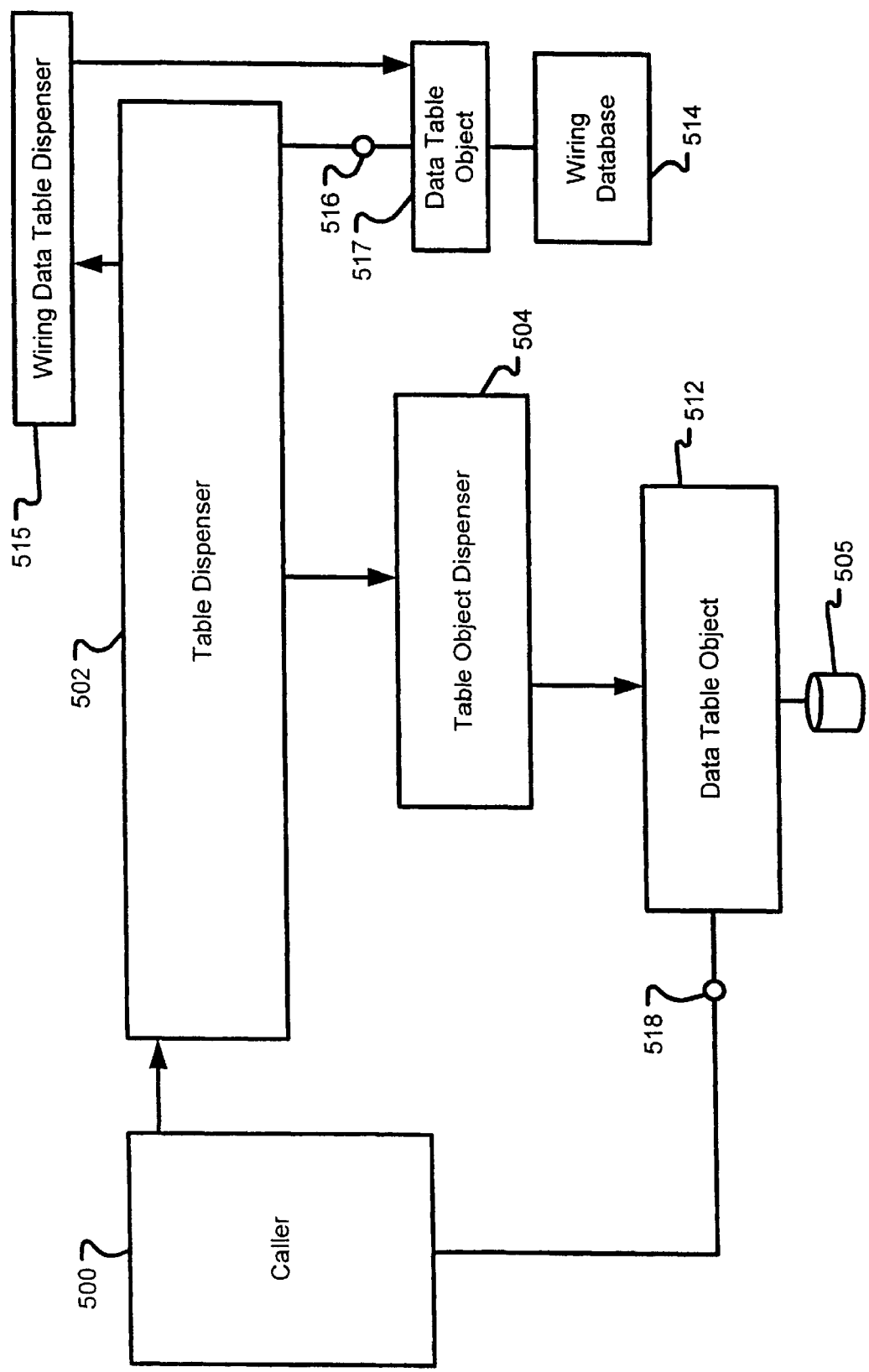
FIGS. 5A and 5B show table dispenser systems for dispensing catalog table objects in embodiments of the present invention.

FIG. 5A shows a table dispenser system for dispensing a catalog table object in an embodiment of the present invention. A caller 500, which could include a catalog server or a runtime catalog, for example, specifies the configuration data it requires by passing input parameters to the table dispenser 502. Although FIG. 5A depicts a catalog-oriented caller, the table dispenser 502 can be used more generally to provide abstraction levels between a caller and one or more datastores, without being limited to catalogs or configuration data. For example, a wiring data table dispenser 515 is used to provide a data table object 517 for accessing data in the wiring database 514.

The caller 500 passes input parameters to the table dispenser 502. In an embodiment of the present invention, the input parameters include identity, query, and level of service parameters. The identity parameter preferably includes a database ID and a table ID to specify the database and table from which the caller 500 is requesting configuration data.

The query may include a query format parameter, a query meta parameter, and a query data parameter, all of which may be NULL pointers. The query format parameter indicates the specific format of the query and governs the nature of input data passed in the query meta and query data parameters.

Multiple query forms are supported. A first query form includes a unicode query string and a unique identifier of its format, such as supported in the SQL (Structured Query Language). In this example, the query format parameter would indicate an SQL query using the unique identifier, the query data would include the unicode query string, and the query meta parameter would be NULL. Alternatively, a length parameter or other table formatting parameters may be included in the query meta parameter.

A second query form includes a simple "and/or" query format that supports a "Boolean search"-type query identified as eQF_SIMPLE_ANDOR (i.e., the query format parameter includes eQF_SIMPLE_ANDOR). The query syntax (i.e., as included in the query data parameter) can be expressed as: "[COLa=VALa1[|VALa1[]][&COLb=VALb1[|VALb2[. .]]]]", where COLx is a column ordinal and VALxn is the string form of a column value. The syntax is preferably case sensitive. DBTYPE_U14 values appear as integers. DBTYPE_GUID values include curly braces (i.e., "{" and "}"). D BTYPE_DBTIMESTAMP values are in the "hh:mm:ss mm/dd/yy" format. DBTYPE_BYTES values appear in hexadecimal format.

Certain reserved column ordinals exist that are not part of any table but are used as reserved queries to locate an appropriate table. These column ordinals are listed and described in Table 1.

TABLE 1

Reserved queries

| Column Ordinal | Description |
| --- | --- |
| iCOL_CMPNAME | Specifies a computer name (This column ordinal appears in client table queries.) |
| iCOL_SNAME | Specifies a directory service name that resolves via the client table to an iCOL_CMPNAME (This column ordinal appears in client table queries.) |

TABLE 1-continued

Reserved queries

| Column Ordinal | Description |
| --- | --- |
| iCOL_FILE | Specifies a file name. |
| iCOL_INDEX | Specifies an index hint with a value that is a column name. An index hint is used in optimizing a table selection. (This column ordinal is ignored by data tables that do not support index hints.) |

The level of service includes a table of flags identifying attributes of the requested table, including without limitation:

READ_ONLY—Obtains a read-only table (whereas the default is a read-write table) to reduce overhead and increase performance. As such, the table data cannot be updated from the datastore or otherwise modified in the datastore.

NONMARSHALABLE—Obtains a non-marshalable table to reduce overhead and increase performance. In COM technology, marshaling is the process of putting data in a defined format for transfer across a process or computer boundary. As such, the NONMARSHAL-ABLE flag indicates that the table object providing a requested table should not support the overhead required for marshaling across processes and systems. This flag is set when marshaling is not required and runtime performance is crucial.

SINGLE CURSOR—Obtains a single cursor table (whereas the default is a multi-cursor table) to reduce overhead and increase performance in scenarios where only one cursor is required.

EMPTY—Obtains an empty write cache and no read cache (default is a populated read cache) for non-reading write scenarios.

INCOMING—Guarantees that the first client call to the table object will consume a marshalable table object.

NOLOGIC—Obtains a data table object directly, omitting any intervening logic table objects.

Upon receiving the identity of the requested table, the table dispenser 502 queries a wiring database 514 for general wiring instructions. The wiring database 514 is accessed via a data table object 517 that provides a defined interface 516 to the wiring information stored in the wiring database 514. The data table object 517 is dispensed to the table dispenser 502 by a wiring data table dispenser 515, which is preferably specified by a database wiring bootstrap table (see table 600 in FIG. 6) in the registry of the system (see Table 2). Based on the database ID and the table ID provided by the caller, the table dispenser 502 retrieves a first level of wiring instructions from the wiring database 514 and potentially other ancillary wiring databases (not shown). The wiring instructions may be a compilation of database-specific or table-specific wiring information, including the class IDs and related locators for one or more table object dispensers (i.e., specific data table dispensers or logic table dispensers) corresponding to the provided database ID and table ID.

After querying the wiring database 514, the table dispenser 502 calls one or more table object dispensers (such as table object dispenser 504) specified in the wiring information, passing forward the identity, query, and level of service parameters. The table object dispenser 504 is coded to return to the table dispenser 502 (and therefore to the caller 500) a pointer to a table object 512 that satisfies the input parameters. In the illustrated embodiment, a single data table object 512 is dispensed to provide the caller 500 with the requested table of configuration data through the table interface 518. The configuration data provided through the table interface 518 is sourced from datastore 505 in FIG. 5A.

Figure 5B:
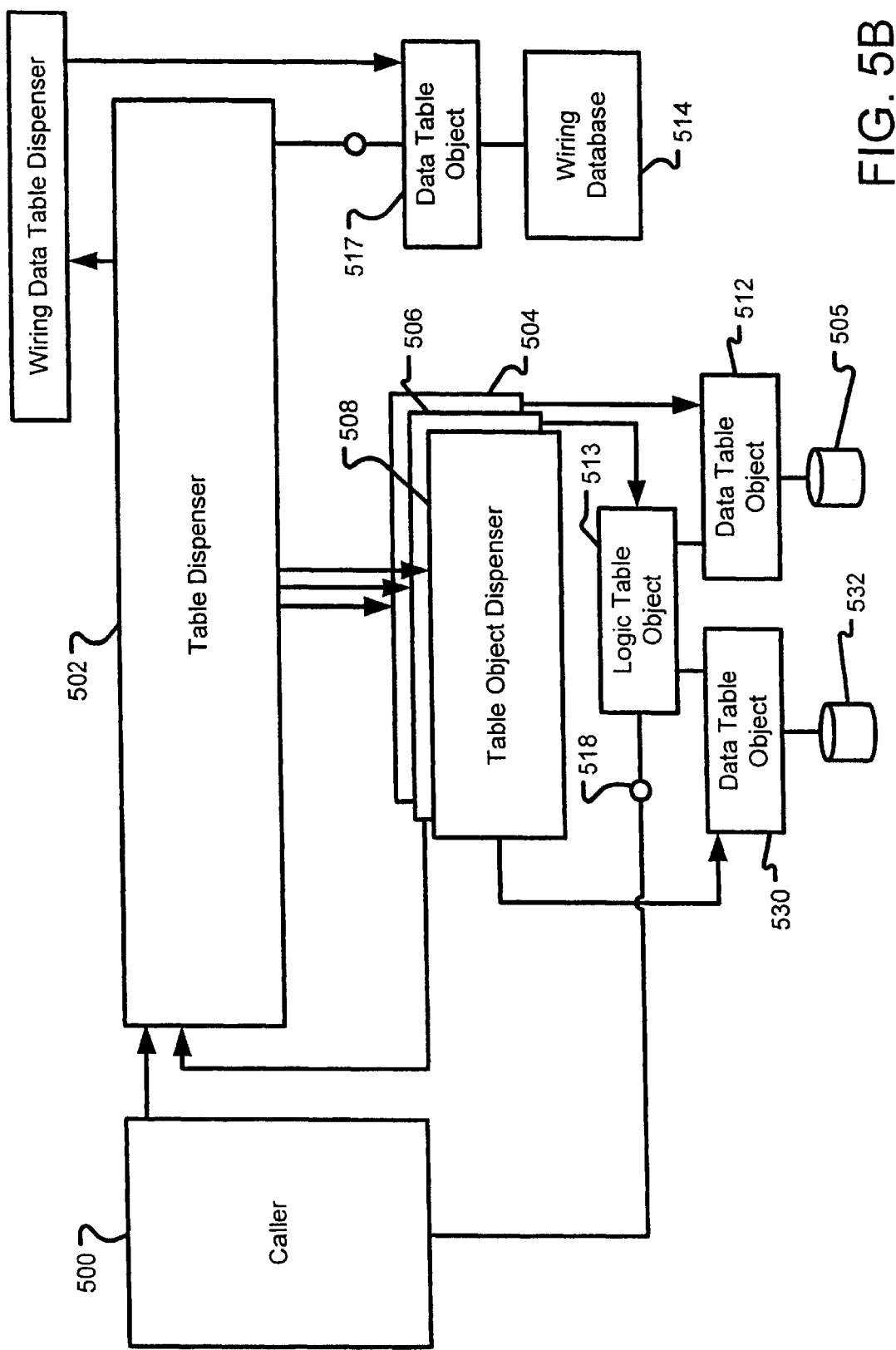

In the embodiment illustrated in FIG. 5B, the table object required to provide a requested table of configuration information to the caller 500 requires a more complex combination of data table and logic table objects. In this embodiment, the table dispenser 502 reads a wiring relationship corresponding to the provided identity parameters from the wiring database 514 through the data table object 517. The wiring relationship indicates both a logic table object dispenser 506 and a data table object dispenser 504 are needed to satisfy the table request from the caller 500. Accordingly, the table dispenser 502 calls the data table object dispenser 504 to create the data table object 512, binding it to the datastore 505. The table dispenser 502 then calls the logic table object dispenser 506 to dispense the logic table object 513, passing a pointer to the data table object 512 in the calling parameters (i.e., binding the logic table object 513 to the data table object 512). For purposes of this discussion, the data table object 512 is referred to as a lower-level or sub-table object of logic table object 513.

In the illustrated embodiment in FIG. 5B, the logic table object dispenser 506 is programmed to reuse other tables to satisfy requests from callers. Rather than providing the entire underlying table object itself, the table object dispenser 506 can rely on other table object dispensers (such as dispenser 508) to provide portions of the data or logic for the requested table. That is, the table object dispenser 506 is programmed to call the table dispenser 508 with the identity (database IDs and table IDs), queries, and levels of service for a sub-table. The table dispenser 502 then re-queries the wiring database 514 with the new set of database IDs and table IDs to obtain the appropriate wiring information for each sub-table object dispenser, which the table dispenser 502 uses to call the corresponding data table object dispenser 508. The data table object dispenser 508 dispenses a data table object 530, which is bound to datastore 532.

Furthermore, this recursion can continue until the desired logic table object 513 is dispensed. As each sub-table object is instantiated, a pointer to the sub-table is passed up to the next overlaying table object, until the multiple table objects and/or multiple levels of table objects are combined to present a requested table interface 518 from the resulting logic table object 513. Alternatively, a resulting table object may be in one of many assorted table system combinations, including those illustrated in FIGS. 2 and 4.

In the illustrated embodiment, the logic table object 513 and two sub-table objects (512 and 530) are dispensed to provide the caller 500 with the requested table of configuration data through the table interface 518. The configuration data provided through the table interface 518 is sourced from datastores 505 and 532 in FIG. 5B.

Figure 6:
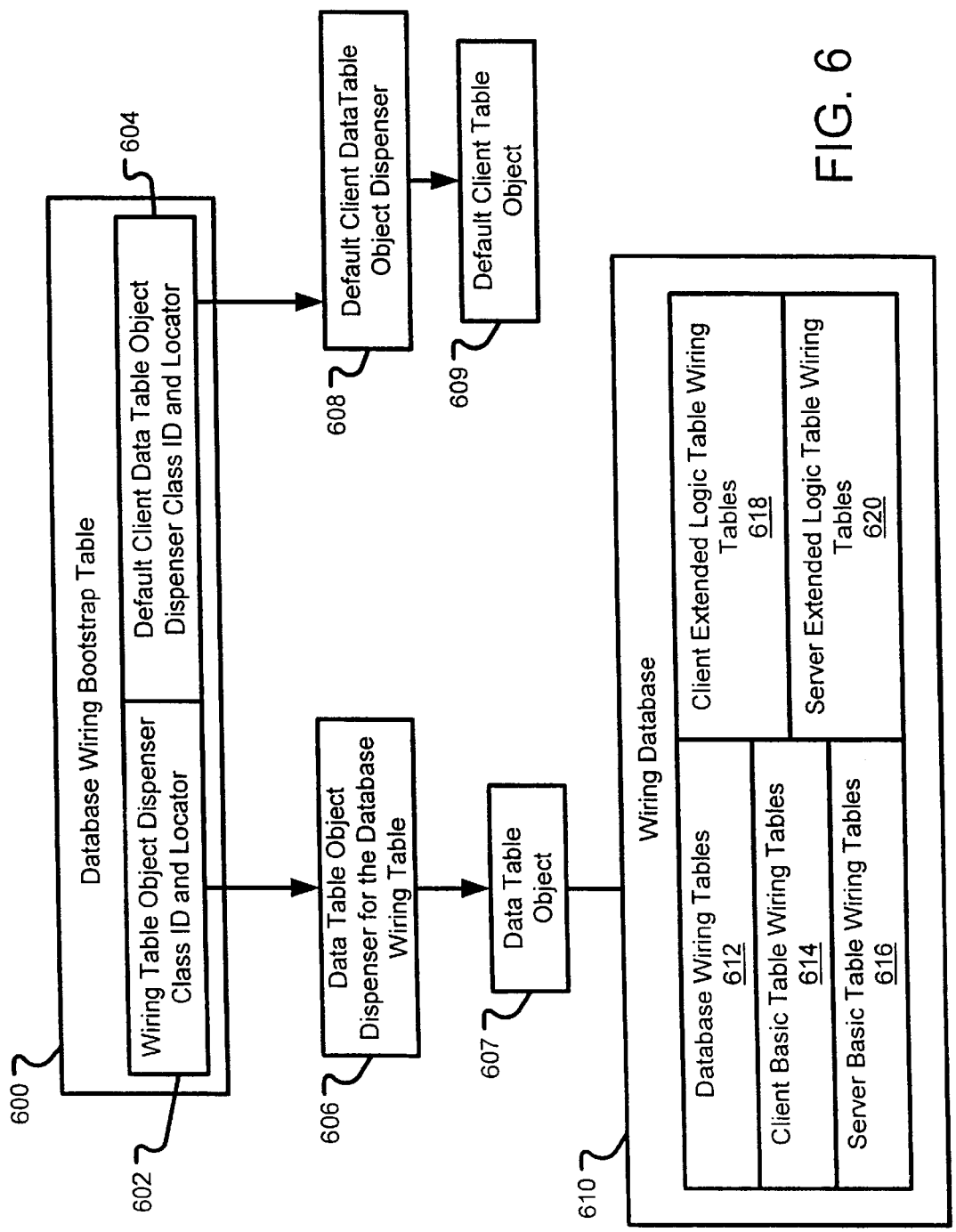
FIG. 6 illustrates a representation of a database wiring bootstrap table and associated dispensers wiring tables in an embodiment of the present invention.

FIG. 6 illustrates a representation of a database wiring bootstrap table 600 and associated wiring tables in an embodiment of the present invention. Although a single table object dispenser implementation exists that provides both client and server catalog table implementations, the necessary wiring information differs between client and server table objects. Accordingly, these differences are primarily accommodated in the corresponding wiring databases, which may be dynamically configured, rather than in the table dispenser implementation code for each table type.

In the illustrated embodiment, the database wiring bootstrap table 600 includes instructions directing a table dispenser (see table dispenser 502 in FIG. 5A) to individual table object dispensers available within the system. The bootstrap instructions preferably reside in a well-known fixed registry location and provide the only persistent dispenser information not obtained through a catalog table interface. A class ID, preferably in the form of a GUID (globally unique identifier), and locator (both shown at 602) indicating a data table dispenser 606 for the wiring database 610 are included in the database wiring bootstrap table 600. The table dispenser invokes the data table dispenser 606 to obtain a data table object 607 to access the wiring information in wiring data base 610. Each class ID uniquely identifies the class from which the dispenser object is created, and each locator identifies the computer location of the component capable of instantiating the dispenser object.

Furthermore, a class ID and an optional locator (both shown at 604) for a default client data table object dispenser 608 are also included in the database wiring bootstrap table 600. If no database-specific wiring information is available on a client, the table dispenser will default to use the client data table object dispenser indicated in 604 to dispense a client table object 609 for use in accessing configuration data through one of more catalog servers.

In a preferred embodiment of the present invention, the database wiring bootstrap table 600 includes a single-row table in a system's registry identified with the table ID of tidSTD_DBWIRING_BOOTSTRAP. A preferred table schema for the database wiring bootstrap table is shown in Table 2, where the "G" represents a DBTYPE_GUID, "S" represents a DBTYPE_WSTR, "U" (see Table 3) represents DBTYPE_U14, etc. in accordance with known column types in a COM+ environment.

TABLE 2

Database Wiring Bootstrap Table Schema

| Column Ordinal | Column Type | Optional? | Column Description |
| --- | --- | --- | --- |
| 0 | G | n | The class ID for the data table dispenser for the database wiring table |
| 1 | S | n | The locator for the database wiring table |
| 2 | G | n | The class ID for the default client data table dispenser |
| 3 | S | y | The default client data table locator |

In Table 2, column 0 specifies the class ID for the data table dispenser used to access the wiring database. The dispenser returns to a caller an interface to a data table object of the wiring database information. Column 1 specifies the locator for the data table dispenser. Column 2 specifies a default client data table dispenser for use by a client process to instantiate a client table object, which is bound to one or more catalog servers. Column 3 specifies an optional locator for the default client table dispenser.

The wiring database 610 preferably comprises a combination of tables, such as database wiring tables 612, client basic table wiring tables 614, server basic table wiring tables 616, client extended logic wiring tables 618, and server extended logic wiring tables 620. The database wiring tables 612 provides general wiring instructions for given databases (i.e., database-wide wiring instructions). Table-specific wiring instructions are provided by tables 614, 616, 618, and 620, which are optional. Each database instance known to the table dispenser 502 of FIG. 5 has a row in at least one of the database wiring tables 612 and may also have one or more of the four table-specific tables. The wiring instructions for all databases known to the dispenser 502 preferably reside in the same wiring database 610, which is identified by the database ID, didSTD_DBWIRING.

The catalog infrastructure supports two different classes of databases: computer-wide databases and file-wide databases. For a computer-wide database, at most one instance of that database can reside on a particular computer. The COM+ registration database (RegDB) is an example of a computer-wide database. For a file-wide database, at most one instance of that database can reside within a particular file. A COM+ deployment unit is an example of a file-wide database.

The database wiring table 612 contains general wiring instructions for known databases. For a given database instance, a set of wirings exists that allows a catalog table dispenser to wire requests for any table in that database to the appropriate datastore. A database wiring ID (DWID) identifies the database wiring instructions for a particular database. For a computer-wide database, only one set of wirings exists on a given computer and the DWID is the same as the DID. These wirings differ across computers when different datastores are chosen and when different versions of the database instance exist. For a file-wide database, multiple sets of wirings can exist on a given computer, one for each version of the file; therefore, the DWID differs from the DID, allowing the same file-wide database to have distinct information on the same computer for each version of the file. For example, one version of a COM+ deployment unit contains both type libraries (tlbs) and component libraries (clbs), whereas another version of a COM+ deployment unit contains only clbs. As such, a single DID may have several distinct sets of database wiring instructions.

For each DWID or DID, a database-specific table dispenser and locator are specified. The wiring table dispenser uses this information to access the wiring tables specific to that DWID or DID. The database wiring table schema for a database wiring table 612, identified as tidSTD_DBWIRING, in an embodiment of the present invention is illustrated in Table 3.

TABLE 3

An Exemplary Database Wiring Table Schema

| Column Ordinal | Column Type | Optional? | Column Description |
| --- | --- | --- | --- |
| 0 | G | n | The database wiring ID (DWID) (same as DID for computer--wide databases) |
| 1 | G | n | The data table object dispenser for the database-specific wiring table object |
| 2 | S | n | The locator for the database-specific wiring table object |
| 3 | U | y | Non-zero when the client basic table wiring table is non-empty |
| 4 | U | y | Non-zero when the client extended logic wiring table is non-empty |
| 5 | U | y | Non-zero when the server basic table wiring table is non-empty |
| 6 | U | y | Non-zero when the server extended logic wiring table is non-empty |
| 7 | G | y | The default client data table object dispenser |
| 8 | G | y | The default server data table object dispenser |

TABLE 3-continued

An Exemplary Database Wiring Table Schema

| Column Ordinal | Column Type | Optional? | Column Description |
|---|---|---|---|
| 9 | G | y | The default client data table object locator |
| 10 | G | y | The default server data table object locator |
| 11 | U | y | Non-zero means concatenate the default client locator with the table-specific locator |
| 12 | U | y | Non-zero means concatenate the default server locator with the table-specific locator |

In Table 3, column 0 of a database wiring table schema in an embodiment of the present invention represents a DWID for a given database. Columns 1 and 2 represent a class ID and a locator for a DWID-specific wiring table dispenser. This approach allows the general database wiring table and corresponding datastore to contain only general wiring information for all the databases supported in the system. The DWID-specific wiring table dispenser is bound to an alternate datastore, where the bulk of the wiring instructions for a particular database is stored.

There are at least three scenarios relating to wiring information:

(1) Default Database Wiring: All wiring for a database is database-wide and is defined exclusively by a database wiring table. No table-specific wiring information exists for the database. In this scenario, the default client or server data table dispenser is used to provide access to the requested table.

(2) Default Database Wiring with Table-specific Overrides: Some wiring for a database is table-specific and other wiring for a database is database-wide, depending on the provided TID. In this scenario, the default client or server data table dispenser is used to provide access to the requested table unless a table-specific basic table wiring table or extended logic wiring table rows exists for the provided TID.

(3) Per-table Basis: All wiring for a database is table-specific and defined exclusively by table-specific basic table or extended logic wiring tables.

Columns 3 through 6 are flags indicating whether non-empty basic table or extended logic wiring tables exist for the database indicated by the DWID. Column 7 through 10 are class IDs and locators for default client and server dispensers, which are used if table-specific wiring is not provided for a given DWID and TID. Columns 11 and 12 are flags instructing the dispenser to concatenate the default locator for the client or server data tables with the table-specific locator, allowing datastores that have lengthy locators to save space and eliminate redundancy in their wiring instructions.

Each table in a database can have its own table-specific wiring instructions that override the database-wide wiring instructions. Basic per-table wiring instructions are split between two schema: a basic client table wiring table (tdiSTD_BCTWIRING) and a basic server table wiring table (tidSTD_BSTWIRING). An exemplary "basic table" wiring table schema is illustrated in Table 4.

TABLE 4

An Exemplary "Basic Table" Wiring Table Schema

| Column Ordinal | Column Type | Optional? | Column Description |
|---|---|---|---|
| 0 | G | n | The table ID |
| 1 | G | y | The data table object dispenser |
| 2 | S | y | The data table object locator |
| 3 | G | y | The logic table object dispenser (must be NULL when extended logic wiring is necessary) |
| 4 | U | y | Non-zero when logic wiring is also to occur with read-only table requests |
| 5 | U | y | 1 when extended wiring logic is necessary |
| 6 | U | y | Non-zero when no data table object is to exist below the logic table object (at least one logic table must exist if this field is non-zero) |

In Table 4, the TID in column 0 serves as a row identity and specifies the corresponding table requested by the dispenser. For each TID, a data table dispenser and locator are optionally specified. When not present, the database-wide default data table dispenser is used from the corresponding database wiring table. An optional class ID for a logic table dispenser is specified in column 3. If column 3 contains a NULL value, then "extended logic" wiring is provided by an extended logic wiring table, as described relative to Table 5.

Column 4 represents a flag that is non-zero when logic wiring is a requests. Column 5 represents a flag that is 1 when extended logic wiring information is provided by an extended logic wiring table. Column 6 represents a flag that is non-zero when a logic table is to be created without an underlying data table.

An "extended logic" wiring table provides more complex wiring information to support, for example, the serial logic table system 404 of FIG. 4. Alternatively, an extended logic wiring table can provide wiring information other configurations, such as a hierarchical tree of logic table objects, where consolidated access to multiple peer sub-table objects (i.e., logic table and/or data table objects) is provided through a higher level logic table object. Furthermore, additional complex logic support may be implemented in a specialized logic table object dispenser. The extended logic wiring table schema of Table 5 represents wiring information for an exemplary serial logic table system. A serial logic table for a client table object is identified as TIDSTD_SCLWIRG, and a serial logic wiring table for a server table object is identified as TIDSTD_SSLWIRING.

TABLE 5

An Exemplary "Extended Logic" Wiring Table Schema

| Column Ordinal | Column Type | Optional? | Column Description |
|---|---|---|---|
| 0 | G | n | The table ID |
| 1 | G | n | The logic table object dispenser |
| 2 | S | n | The order of this logic table relative to the other |

The TID in column 0 serves as a row identity and specifies the corresponding table requested by the dispenser. Column 1 represents the logic table dispenser that provides the table object requested. Column 2 indicates the zero-based index of the current logic table object, relative to the other logic table objects in the logic table object sequence, where zero indicates the (lowest level) logic table object bound to a data table object. Using the wiring information in one or more serial logic wiring tables for a given table ID, a sequence (i.e., a serial cascade) of logic table objects can be implemented as shown in table system 404 of FIG. 4

Figure 7:
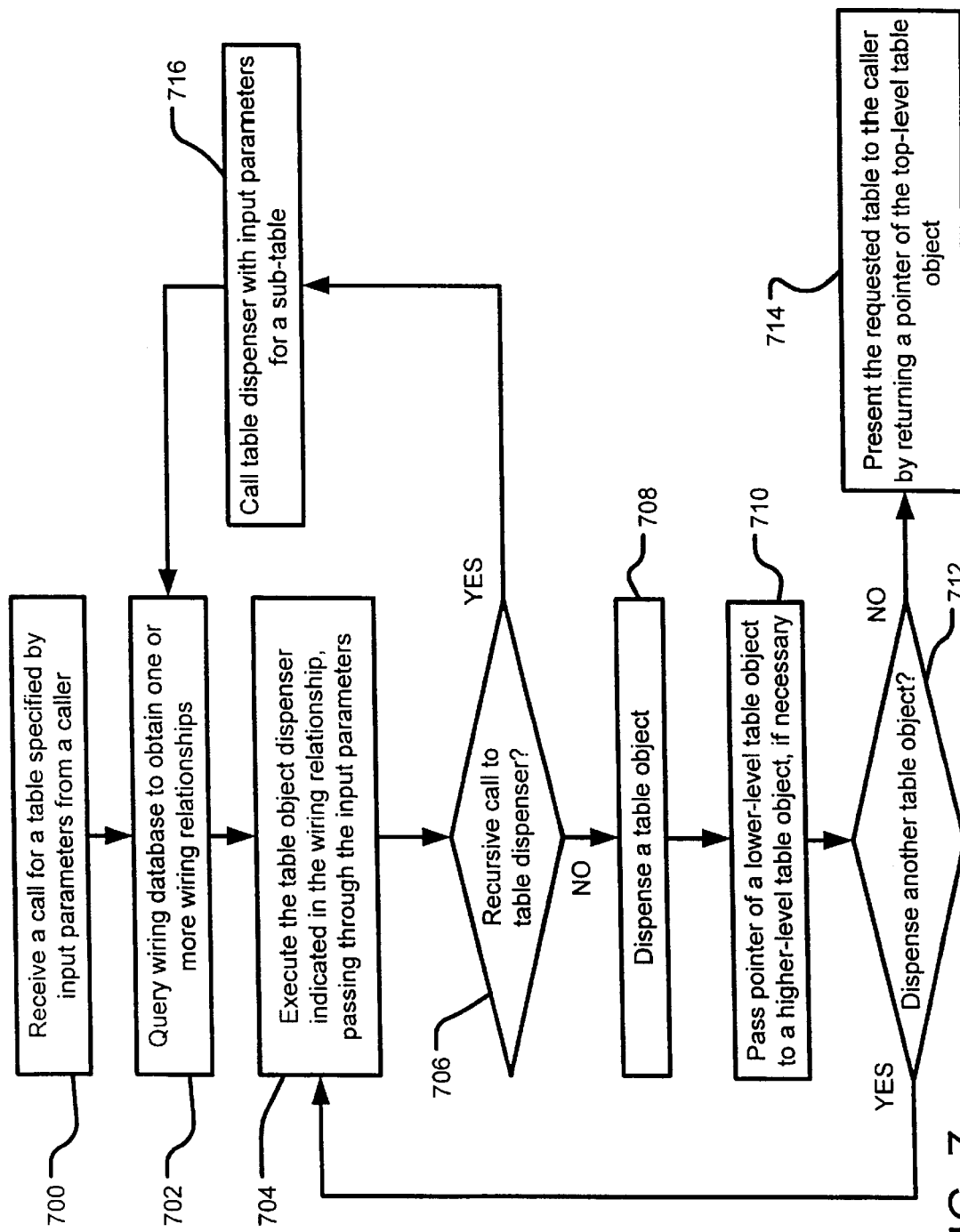
FIG. 7 illustrates a flowchart of operations for dispensing a catalog (e.g., a data table or a logic table) in an embodiment of the present invention.

FIG. 7 illustrates a flowchart of operations for dispensing a catalog table object (e.g., a data table object, a client table object or a logic table object) in an embodiment of the present invention. Operation 700 receives a call from a caller requesting a table of configuration data based on input parameters, such as a database ID, a table ID, query parameters, and level of service parameters. In an embodiment of the present invention, the call is received by a table dispenser, which queries a wiring database to obtain one or more wiring relationships in operation 702. The wiring relationships relate various input parameters to one or more table object dispensers. The table dispenser retrieves the class ID and locator for the related table object dispensers and executes them in operation 704, passing through the input parameters to each table object dispenser.

Operation 706 determines whether a recursive call to the table dispenser is required to complete the table system. Each table object dispenser can be implemented to rely on other existing table objects and table objects dispensers, where possible. As such, if such recursion is required, then operation 716 calls the table dispenser with input parameters for an underlying table or sub-table. The table dispenser again queries the wiring database using the new input parameters and identifies one or more new wiring relationships in operation 702.

If recursion is not required, the table object dispenser corresponding to a lower-level object dispenses a table object in operation 708. If necessary, to bind the upper level table object to the lower level table object, the pointer to the lower-level table object is passed in operation 710 to the table dispenser of the table upper-level object, which dispenses the upper-level table object. Operation 712 determines whether another table object must be dispensed. In an embodiment of the present invention, operation 712 is accomplished by stepping back through the recursion levels of operation 706. When operation 714 is performed to present the requested table to the caller by returning a pointer of the top-level table object, all table object dispensers have dispensed their respective table objects and the table system has been built to support the requested input parameters.

The embodiments of the invention described herein may be implemented as logical operations in one or more computer systems. The logical operations of the present invention are implemented (1) as a sequence of processor-implemented steps executing in one or more computer systems and (2) as interconnected machine modules within one or more computer systems. The implementation is a matter of choice, dependent on the performance requirements of the computer system implementing the invention. Accordingly, the logical operations making up the embodiments of the invention described herein are referred to variously as operations, steps, objects, or modules.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A computer program storage medium readable by a computing system and encoding a computer program for executing a computer process identifying a first table object dispenser of a plurality of table object dispensers, each table object dispenser being capable of creating a table object to present a table of configuration information stored in one or more datastores, the computer process comprising:

receiving an identity parameter specifying a requested table of the configuration information;

reading a first wiring relationship from a wiring database based on the identity parameter, the first wiring relationship relating the identity parameter to the first table object dispenser; and identifying the first table object dispenser based on the first wiring relationship, wherein the first table object dispenser is capable of creating a first table object to present at least a portion of the requested table of configuration information.

2. The computer program storage medium of claim 1 wherein the computer process further comprises:

reading a second wiring relationship from the wiring database based on the identity parameter, the second wiring relationship relating the identity parameter to a second table object dispenser of the plurality of table object dispensers; and identifying the second table object dispenser based on the second wiring relationship, wherein the second table object dispenser is capable of creating a second table object to present another portion of the requested table of configuration information.

3. A computer-readable medium having stored thereon a wiring table data structure comprising:

a first data field containing identity parameter data specifying an identity parameter specifying a requested table of configuration information stored in one or more datastores; and a second data field containing first table object dispenser data associated with a first table object dispenser, the first table object dispenser being one of a plurality of table object dispensers, the identity parameter data and the first table object dispenser data being associatively stored in the first data field and the second data field to create a first wiring relationship between the identity parameter and the first table object dispenser.

4. The computer-readable medium of claim 3 wherein the first table object dispenser is capable of creating a first table object to present at least a portion of the requested table of configuration information.

5. The computer-readable medium of claim 3 wherein the wiring data structure further comprises:

a third data field containing identity parameter data specifying the identity parameter; and a fourth data field containing second table object dispenser data specifying a second table object dispenser, the second table object dispenser being one of the plurality of table object dispensers, the identity parameter data and the second table object dispenser data being associatively stored in the third data field and the fourth data field to create a second wiring relationship between the identity parameter and the second table object dispenser.

6. The computer-readable medium of claim 5 wherein the second table object dispenser is capable of creating a second table object to present another portion of the requested table of configuration information.

7. The computer-readable medium of claim 5 wherein the wiring table data structure further comprises:

a fifth data field containing table ordering data defining a serial cascade of the table objects dispensed by the first table object dispenser and second table object dispenser.

8. A system for identifying a first table object dispenser for presenting at least a portion of a requested table of configuration information stored in one or more datastores, wherein the requested table is identified by an identity parameter, the system comprising:

a plurality of table object dispensers including the first table object dispenser, and a wiring database defining a first wiring relationship between the identity parameter and the first table object dispenser, the first wiring relationship identifying the first table object dispenser as capable of creating a first table object for presenting at least the portion of the requested table of configuration information.

9. The system of claim 8 wherein the plurality of table object dispensers includes a second table object dispenser and the wiring database defines a second wiring relationship between the identity parameter and the second table object dispenser, the second wiring relationship identifying the second table object dispenser as capable of creating a second table object for presenting another portion of the requested table of configuration information.

10. The system of claim 8 further comprising:

a table dispenser receiving the identity parameter and accessing the wiring database to identify the first table object dispenser.

11. A method of identifying a first table object dispenser of a plurality of table object dispensers, each table object dispenser being capable of creating a table object to present a table of configuration information stored in one or more datastores, the method comprising:

receiving an identity parameter specifying a requested table of the configuration information;

reading a first wiring relationship from a wiring database based on the identity parameter, the first wiring relationship relating the identity parameter to the first table object dispenser; and identifying the first table object dispenser based on the first wiring relationship, wherein the first table object dispenser is capable of creating a first table object to present at least a portion of the requested table of configuration information.

12. The method of claim 11 further comprising:

reading a second wiring relationship from the wiring database based on the identity parameter, the second wiring relationship relating the identity parameter to a second table object dispenser; and identifying the second table object dispenser based on the second wiring relationship, wherein the second table object dispenser is capable of creating a second table object to present another portion of the requested table of configuration information.

* * * * *